(12) United States Patent
Kang et al.

(10) Patent No.: US 10,625,736 B2
(45) Date of Patent: Apr. 21, 2020

(54) VEHICLE AND METHOD FOR SUPPORTING DRIVING SAFETY OF VEHICLE

(71) Applicants: HYUNDAI MOTOR COMPANY, Seoul (KR); KIA MOTORS CORPORATION, Seoul (KR)

(72) Inventors: Min Chul Kang, Uiwang-si (KR); Chan Il Park, Chungcheongbuk-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 280 days.

(21) Appl. No.: 15/645,369

(22) Filed: Jul. 10, 2017

(65) Prior Publication Data

US 2018/0297590 A1 Oct. 18, 2018

(30) Foreign Application Priority Data

Apr. 18, 2017 (KR) ........................ 10-2017-0049817

(51) Int. Cl.
*B60W 30/09* (2012.01)
*B60W 30/14* (2006.01)
(Continued)

(52) U.S. Cl.
CPC .......... *B60W 30/09* (2013.01); *B60W 30/143* (2013.01); *B60W 30/16* (2013.01);
(Continued)

(58) Field of Classification Search
CPC .... B60W 30/09; B60W 30/143; B60W 30/16; B60W 50/085; B60W 2050/0095;
(Continued)

(56) References Cited

U.S. PATENT DOCUMENTS

2004/0193347 A1* 9/2004 Harumoto ........... B60R 21/0132
701/45
2007/0150196 A1* 6/2007 Grimm ..................... B60T 7/22
701/301
(Continued)

FOREIGN PATENT DOCUMENTS

JP 2006-221498 A 8/2006
JP 2014-126970 A 7/2014
(Continued)

*Primary Examiner* — Sze-Hon Kong
(74) *Attorney, Agent, or Firm* — Morgan, Lewis & Bockius LLP

(57) ABSTRACT

An apparatus for controlling driving of a vehicle includes an active safety driving device for changing a driving mode of the vehicle from a normal driving mode to an active safety driving mode, a front detection sensor for recognizing a front vehicle as a control target dangerous vehicle when the front vehicle attempts to change into a lane in which the vehicle travels, and a vehicle control device for determining whether to generate a margin shaping for the control target dangerous vehicle, and for controlling the active safety driving device based on the margin-shaped control target dangerous vehicle when the margin shaping is applied to the control target dangerous vehicle.

18 Claims, 8 Drawing Sheets

(51) Int. Cl.
*G08G 1/16* (2006.01)
*B60W 30/16* (2020.01)
*B60W 50/08* (2020.01)
*B60W 50/00* (2006.01)

(52) U.S. Cl.
CPC .............. *G08G 1/16* (2013.01); *B60W 50/085* (2013.01); *B60W 2050/0095* (2013.01); *B60W 2420/52* (2013.01); *B60W 2540/215* (2020.02); *B60W 2554/00* (2020.02); *G08G 1/166* (2013.01)

(58) Field of Classification Search
CPC ......... B60W 2420/52; B60W 2540/04; B60W 2550/20; B60W 2540/215; B60W 2554/00; G08G 1/16; G08G 1/166
See application file for complete search history.

(56) References Cited

U.S. PATENT DOCUMENTS

| | | | | |
|---|---|---|---|---|
| 2008/0189040 | A1* | 8/2008 | Nasu | G08G 1/163 701/301 |
| 2013/0325311 | A1* | 12/2013 | Yoo | G08G 1/16 701/301 |
| 2014/0125474 | A1* | 5/2014 | Gunaratne | G08G 1/163 340/439 |
| 2014/0163859 | A1 | 6/2014 | Tsuchida | |
| 2014/0324330 | A1* | 10/2014 | Minemura | G08G 1/16 701/301 |
| 2015/0175160 | A1* | 6/2015 | Sudou | B60W 30/09 701/70 |
| 2016/0059855 | A1* | 3/2016 | Rebhan | B60W 30/08 701/41 |
| 2016/0311416 | A1 | 10/2016 | Bretzigheimer et al. | |
| 2017/0098132 | A1* | 4/2017 | Yokota | G06T 7/285 |
| 2017/0106750 | A1* | 4/2017 | Tauchi | B60R 1/00 |
| 2017/0277188 | A1* | 9/2017 | Xu | G05D 1/024 |
| 2017/0287186 | A1* | 10/2017 | Saito | G06T 7/521 |
| 2018/0065623 | A1* | 3/2018 | Wodrich | B60W 30/02 |
| 2018/0075309 | A1* | 3/2018 | Sathyanarayana | G06K 9/00 |
| 2018/0198955 | A1* | 7/2018 | Watanabe | B60K 35/00 |
| 2018/0259967 | A1* | 9/2018 | Frazzoli | G08G 1/166 |
| 2019/0012920 | A1* | 1/2019 | Tamura | G08G 1/166 |
| 2019/0143968 | A1* | 5/2019 | Song | B60R 11/04 701/301 |

FOREIGN PATENT DOCUMENTS

| | | |
|---|---|---|
| KR | 10-2014-083677 A | 7/2014 |
| KR | 10-1552017 B1 | 9/2015 |
| WO | 2015-086167 A1 | 6/2015 |

* cited by examiner

| No.1 | GENERATE VIRTUAL LINE CONDITION 1 (Range) | GENERATE VIRTUAL LINE CONDITION 2 (Range Rate) | GENERATE VIRTUAL LINE CONDITION 3 (Angle) | RESULT |
|---|---|---|---|---|
| 1 | NEAR | SMALL | NARROW | FIRST CIRCLE |
| 2 | NEAR | SMALL | NORMAL | SECOND CIRCLE |
| 3 | NEAR | SMALL | LARGE | FIRST CIRCLE |
| 4 | NEAR | NORMAL | NARROW | THIRD CIRCLE |
| 5 | NEAR | NORMAL | NORMAL | THIRD CIRCLE |
| 6 | NEAR | NORMAL | LARGE | SECOND CIRCLE |
| 7 | NEAR | LARGE | NARROW | THIRD CIRCLE |
| 8 | NEAR | LARGE | NORMAL | THIRD CIRCLE |
| 9 | NEAR | LARGE | LARGE | SECOND CIRCLE |
| 10 | NORMAL | SMALL | NARROW | SECOND CIRCLE |
| 11 | NORMAL | SMALL | NORMAL | SECOND CIRCLE |
| 12 | NORMAL | SMALL | LARGE | SECOND CIRCLE |
| 13 | NORMAL | NORMAL | NARROW | THIRD CIRCLE |
| 14 | NORMAL | NORMAL | NORMAL | SECOND CIRCLE |
| 15 | NORMAL | NORMAL | LARGE | FIRST CIRCLE |
| 16 | NORMAL | LARGE | NARROW | THIRD CIRCLE |
| 17 | NORMAL | LARGE | NORMAL | THIRD CIRCLE |
| 18 | NORMAL | LARGE | LARGE | SECOND CIRCLE |
| 19 | NORMAL | SMALL | NARROW | FIRST CIRCLE |
| 20 | FAR | SMALL | NORMAL | FIRST CIRCLE |
| 21 | FAR | SMALL | LARGE | FIRST CIRCLE |
| 22 | FAR | NORMAL | NARROW | SECOND CIRCLE |
| 23 | FAR | NORMAL | NORMAL | FIRST CIRCLE |
| 24 | FAR | NORMAL | LARGE | FIRST CIRCLE |
| 25 | FAR | LARGE | NARROW | SECOND CIRCLE |
| 26 | FAR | LARGE | NORMAL | SECOND CIRCLE |
| 27 | FAR | LARGE | LARGE | FIRST CIRCLE |

FIG. 4A

| No.1 | GENERATE VIRTUAL LINE CONDITION 1 (Range) | GENERATE VIRTUAL LINE CONDITION 2 (Range Rate) | GENERATE VIRTUAL LINE CONDITION 3 (Angle) | RESULT |
|---|---|---|---|---|
| 1 | 6 | 1.5 | 3 | 27 |
| 2 | 6 | 1.5 | 2 | 18 |
| 3 | 6 | 1.5 | 1 | 9 |
| 4 | 6 | 3 | 3 | 54 |
| 5 | 6 | 3 | 2 | 36 |
| 6 | 6 | 3 | 1 | 18 |
| 7 | 6 | 4.5 | 3 | 81 |
| 8 | 6 | 4.5 | 2 | 54 |
| 9 | 6 | 4.5 | 1 | 27 |
| 10 | 4 | 1.5 | 3 | 18 |
| 11 | 4 | 1.5 | 2 | 12 |
| 12 | 4 | 1.5 | 1 | 6 |
| 13 | 4 | 3 | 3 | 36 |
| 14 | 4 | 3 | 2 | 24 |
| 15 | 4 | 3 | 1 | 12 |
| 16 | 4 | 4.5 | 3 | 54 |
| 17 | 4 | 4.5 | 2 | 36 |
| 18 | 4 | 4.5 | 1 | 18 |
| 19 | 2 | 1.5 | 3 | 9 |
| 20 | 2 | 1.5 | 2 | 6 |
| 21 | 2 | 1.5 | 1 | 3 |
| 22 | 2 | 3 | 3 | 18 |
| 23 | 2 | 3 | 2 | 12 |
| 24 | 2 | 3 | 1 | 6 |
| 25 | 2 | 4.5 | 3 | 27 |
| 26 | 2 | 4.5 | 2 | 18 |
| 27 | 2 | 4.5 | 1 | 9 |

FIG. 4B

VEHICLE AND METHOD FOR SUPPORTING DRIVING SAFETY OF VEHICLE

CROSS-REFERENCE TO RELATED APPLICATION

This application claims the benefit of priority to Korean Patent Application No. 10-2017-0049817, filed on Apr. 18, 2017 with the Korean Intellectual Property Office, the disclosure of which is incorporated herein in its entirety by reference.

TECHNICAL FIELD

The present disclosure relates to an apparatus and a method for controlling the driving of a vehicle, and more particularly, to an apparatus and a method for controlling driving of a vehicle which increases the margin of a radar signal of a cut-in vehicle to enhance the agility even in a sudden cut-in situation, thereby contributing to safe driving.

BACKGROUND

In recent years, an advanced driver assistance system (ADAS), which is a system that provides vehicle status, driver status, and surrounding environment information or actively controls a vehicle, has been installed in vehicles in order to reduce the burden on the driver and enhance convenience.

The ADAS installed to a vehicle may include blind spot detection (BSD) for warning of an accident risk in a blind spot, a forward collision warning system (FWC) for warning occupants including a driver about a possible collision with a front vehicle, an advanced emergency braking system (AEBS) for automatically decelerating a vehicle based on the possibility of collision with a front vehicle, smart cruise control (SCC) for automatically accelerating and decelerating a vehicle in relation to a front vehicle, a lane departure warning system (LDWS) for warning occupants including a driver about a lane departure, a lane keeping assist system (LKAS) for preventing a departure from a current traveling lane, and a rear-warning (RCW) system for warning occupants including a driver about a possible collision with a rear vehicle.

In a system for controlling a vehicle, the SCC senses a front vehicle using a front detection sensor. In particular, when a vehicle suddenly interferes with a lane on which a vehicle is traveling is sensed, the vehicle must abruptly decelerate or brake to keep a suitable distance from a front vehicle. In addition, even if a front vehicle suddenly cutting in without keeping an inter-vehicle distance is detected, there may not enough time to avoid the front vehicle, so that the vehicle cannot prevent a collision with the front vehicle.

SUMMARY

An object of the present disclosure is to solve the problem of causing an accident due to a slow response to a sudden cut-in vehicle in an autonomous vehicle traveling system.

According to an aspect of the present disclosure, an apparatus for controlling a drive of a vehicle, which includes an active safety driving device configured to change a driving mode of the vehicle from a normal driving mode to an active safety driving mode, a front detection sensor configured to recognize a front vehicle as a control target dangerous vehicle when the front vehicle attempts to change into a lane on which the vehicle travels, and a vehicle control device configured to determine whether to generate a margin shaping for the control target dangerous vehicle, and to control the active safety driving device based on the margin-shaped control target dangerous vehicle when the margin shaping is applied to the control target dangerous vehicle.

The active safety driving mode may include at least one of smart cruise control (SCC), advanced emergency braking (AEB) and blind spot detection (BSD).

The front detection sensor may include a radar.

The margin shaping may generate a virtual line through expansion from the control target dangerous vehicle sensed by the front detection sensor in forward, backward, left and right directions by a predetermined distance.

The margin shaping may set a degree of expanding the virtual line from the control target dangerous vehicle based on at least one of a range, a range rate, and an angle between the vehicle and the control target dangerous vehicle, and may generate virtual lines having different amplitudes based on the expansion degree.

The vehicle control device may set a risk level of the control target dangerous vehicle based on a level set based on a degree of danger that a driver senses from the control target dangerous vehicle.

The vehicle control device may determine whether to margin-shape the control target dangerous vehicle based on the level, and may determine whether the margin-shaping is applied to the control target dangerous vehicle based on a driver intention on a size of the margin shaping of the control target dangerous vehicle.

When the margin shaping is applied to the control target dangerous vehicle, the vehicle control device may control the active safety driving device by limiting a deceleration range to prevent the vehicle from being decelerated over a predetermined range in consideration of time-to-collision (TTC) between the vehicle and the margin-shaped control target dangerous vehicle.

When the margin shaping is not applied to the control target dangerous vehicle, the vehicle control device may control the active safety driving device by limiting a deceleration range to prevent the vehicle from being decelerated over a predetermined range in consideration of time-to-collision (TTC) between the vehicle and the control target dangerous vehicle.

The apparatus may further include a storage that stores data including information about the control target dangerous vehicle detected by the front detection sensor, a level set based on a degree of detected danger for the control target dangerous vehicle, whether to margin-shape the control target dangerous vehicle based on the level, and a driver intention for determining a size of the margin shaping based on the level.

According to another aspect of the present disclosure, a method of controlling a drive of a vehicle, which includes entering an active safety driving mode by the vehicle, recognizing a front vehicle, which attempts to change into a lane on which the vehicle travels, as a control target dangerous vehicle, collecting information about the control target dangerous vehicle, setting a risk level of the control target dangerous vehicle, determining whether to generate margin shaping for the control target dangerous vehicle based on the risk level, determining a size of the margin shaping when the margin shaping is generated for the control target dangerous vehicle, and decelerating the vehicle based on the control target dangerous vehicle from which the margin shaping is generated.

The entering the active safety driving mode may include entering at least one of smart cruise control (SCC), advanced emergency braking (AEB) and blind spot detection (BSD).

The collecting of the information about the control target dangerous vehicle may be generated by using a front detection sensor including a radar.

The setting of the risk level may include setting, by a vehicle control device, the risk level of the control target dangerous vehicle based on the risk level of the control target dangerous vehicle set by a driver.

The determining of whether to generate the margin shaping may include determining, by the vehicle control device, whether to generate the margin shaping for the control target dangerous vehicle, based on whether to generate the margin shaping based on the risk level of the control target dangerous vehicle set by a driver and a driver intention on determining of a size of the margin shaping set by the driver.

The method may further includes generating a virtual line through expansion from the control target dangerous vehicle in forward, backward, left and right directions by a predetermined distance based on the information about the control target dangerous vehicle when the margin shaping is generated for the control target dangerous vehicle.

The determining of the size of the margin shaping may include setting a degree of expanding the control target dangerous vehicle based on at least one of a range, a range rate, and an angle between the vehicle and the control target dangerous vehicle, and generating virtual lines having different amplitudes based on the expansion degree.

The decelerating of the vehicle based on the margin shaped control target dangerous vehicle may includes decelerating the vehicle by limiting a deceleration range to prevent the vehicle from being decelerated over a predetermined range in consideration of time-to-collision (TTC) between the vehicle and the margin-shaped control target dangerous vehicle.

The method may further include decelerating the vehicle based on the control target dangerous vehicle actually sensed by the collecting of the information about the control target dangerous vehicle when the margin shaping is not generated for the control target dangerous vehicle.

The decelerating of the vehicle based on the control target dangerous vehicle may include decelerating the vehicle by limiting a deceleration range to prevent the vehicle from being decelerated over a predetermined range in consideration of time-to-collision (TTC) between the vehicle and the control target dangerous vehicle.

According to the present disclosure, the apparatus may more sensitively detect a dangerous obstacle around the vehicle such as a cut-in vehicle by margin-shaping sensing data of the front detection sensor, so that the driver may easily avoid dangerous obstacles around the vehicle without excessive deceleration so as not to feel inconvenience for sudden braking.

BRIEF DESCRIPTION OF THE DRAWINGS

The above and other objects, features and advantages of the present disclosure will be more apparent from the following detailed description taken in conjunction with the accompanying drawings:

FIGS. 4A and 4B are views illustrating reference tables for margin shaping according to exemplary embodiments of the present disclosure;

DETAILED DESCRIPTION

Figure 1:
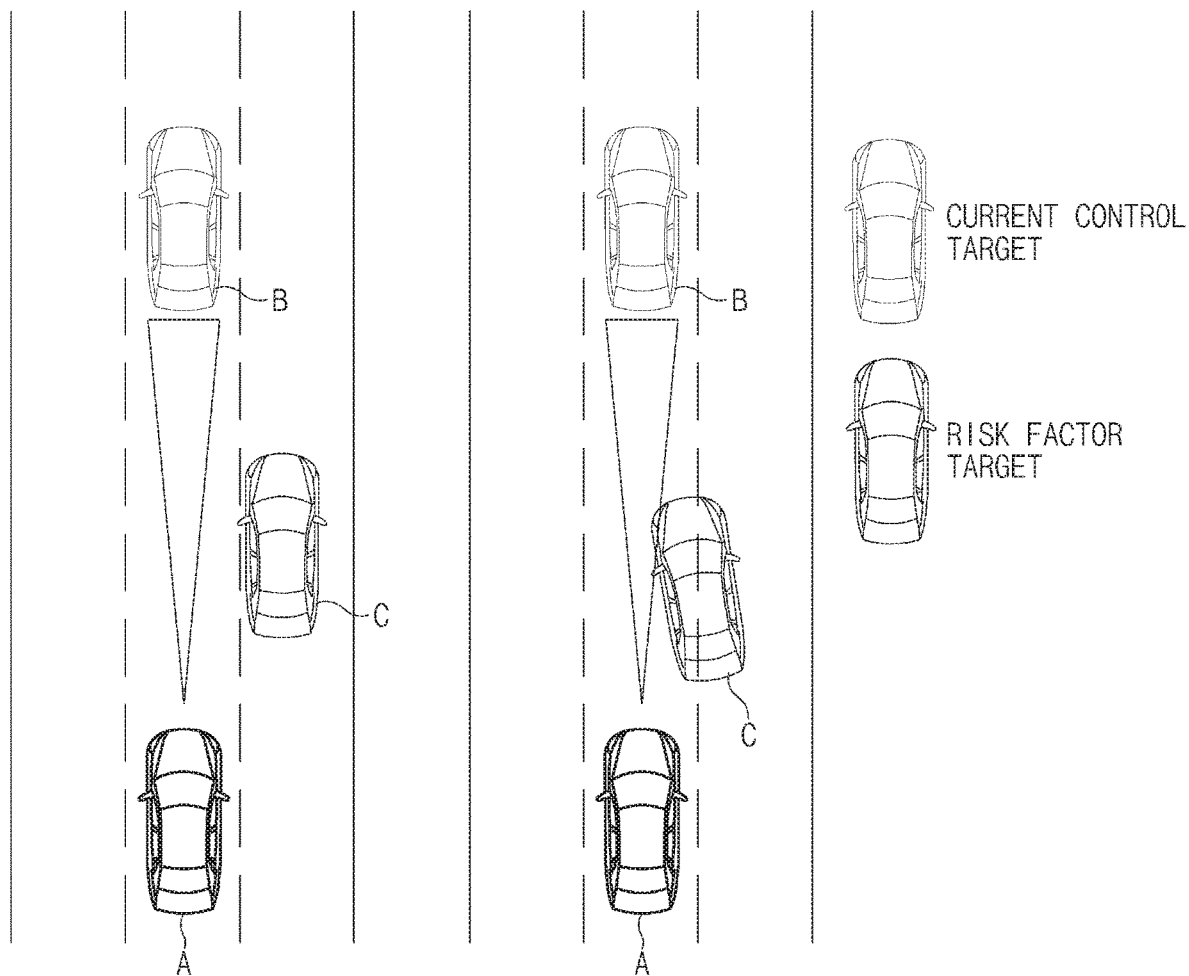
FIG. 1 is a view illustrating recognition of a control target dangerous vehicle according to exemplary embodiments of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing the components of the present disclosure, terms like first, second, A, B, (a), and (b) may be used. These terms are intended solely to distinguish one component from another, and the terms do not limit the nature, order or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating recognition of a control target dangerous vehicle according to exemplary embodiments of the present disclosure.

A front detection sensor recognizes a preceding vehicle 'B' traveling on the same lane as that of a subject vehicle 'A' as a control target vehicle. The subject vehicle 'A' travels at a speed suitable to maintain a proper distance from the preceding vehicle 'B'. Thereafter, when the front detection sensor senses a vehicle 'C' which is going to enter the same lane as the subject vehicle between the preceding vehicle 'B' and the subject vehicle A, the apparatus for controlling a drive of a vehicle according to the present disclosure targets the vehicle which is going to enter the same lane as that of the subject vehicle as a dangerous vehicle, and recognizes the vehicle as a control target dangerous vehicle.

When recognizing the control target dangerous vehicle, the apparatus for controlling a drive, or driving, of a vehicle according to the present disclosure generates margin shaping for the control target dangerous vehicle detected by the front detection sensor. In this case, the margin shaping means a virtual line generated along an outer line of the control target dangerous vehicle to have a size larger than that of the control target dangerous vehicle. The front detection sensor is controlled to sense the virtual line of the control target dangerous vehicle. Thus, it may be easy to secure a safety distance from the control target dangerous vehicle targeted as a dangerous vehicle and to prevent a collision with the dangerous vehicle. Hereinafter, the virtual line may be referred to as a virtual square or a virtual circle, but the shape formed by the virtual line is not limited thereto.

Figure 2:
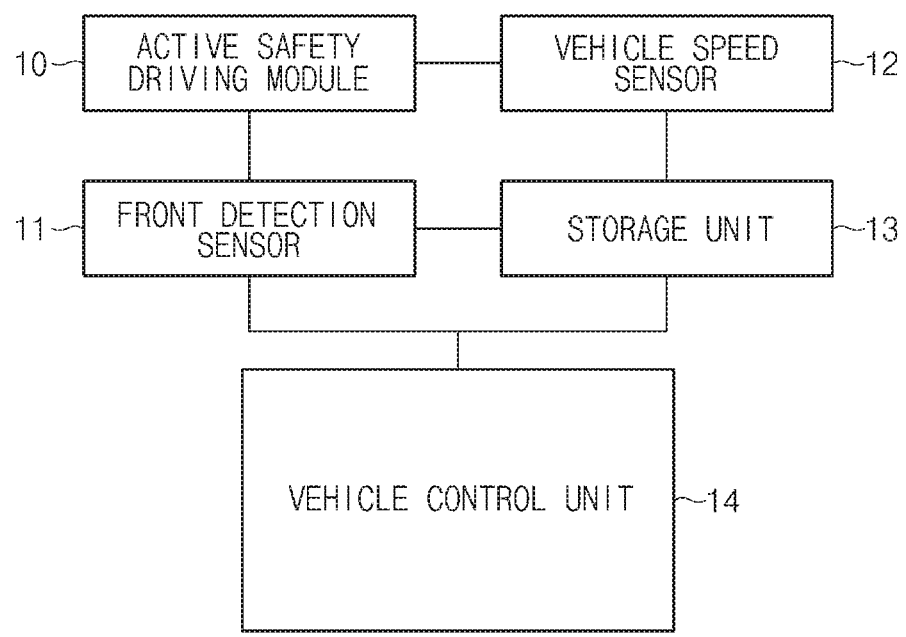
FIG. 2 is a block diagram illustrating an apparatus for controlling a drive of a vehicle according to exemplary embodiments of the present disclosure.

FIG. 2 is a block diagram illustrating an apparatus for controlling driving of a vehicle according to exemplary embodiments of the present disclosure.

As shown in FIG. 2, an apparatus for controlling driving of a vehicle according to embodiments of the present disclosure may include an active safety driving device 10, a front detection sensor 11, a vehicle speed sensor 12, a storage 13 and a vehicle control device 14.

The active safety driving device 10 includes an operation switch that may switch the driving mode of the subject vehicle from a normal driving mode to an active safety driving mode, and enters the active safety driving mode when a driver turns on the operation switch after accelerating the vehicle to a desired speed by depressing an accelerator pedal.

The active safety driving mode may include at least one of smart cruise control (SCC), advanced emergency braking (AFB) and blind spot detection (BSD).

The active safety driving device 10 is controlled such that the speed of the subject vehicle is maintained at a driving speed set before entering the active safety driving mode, and the driving speed set by a user may be increased or decreased depending on the distance from the control target dangerous vehicle sensed by the front sensing sensor 11.

When the front detection sensor 11 detects a vehicle that is going to enter the same lane as that of the subject vehicle, the front detection sensor 11 may recognize the vehicle as a control target dangerous vehicle, collect information about the control target dangerous vehicle, and transmit the information to the vehicle control device 14. The front detection sensor 11 may include a radar sensor. The radar sensor, which detects the distance from the control target dangerous vehicle by using a radio wave, may detect the relative distance and the relative speed between the subject vehicle and the control target dangerous vehicle by measuring the time taken for the radio wave output forward of the subject vehicle to reflect back to the control target dangerous vehicle and return to the subject vehicle.

The vehicle speed sensor 12 may detect the driving speed of the subject vehicle and transmit the driving speed to the vehicle control device 14.

The storage 13 may store data including information about the control target dangerous vehicle detected by the front detection sensor 11, a level set based on a degree of danger that the driver senses about the control target dangerous vehicle, and whether to apply margin shaping to the control target dangerous vehicle based on the level set by the driver, and the driver intention about how much degree of the margin shaping is to be set.

The vehicle control device 14 may set a risk level of the control target dangerous vehicle based on the risk level of the control target dangerous vehicle stored in the storage 13 by the driver.

According to exemplary embodiments, when a vehicle is set at a high risk level and stored in the storage 13 because the driver feels danger to the vehicle suddenly cutting in, the vehicle control device 14 may recognize the vehicle as a control target dangerous vehicle having a high risk level, based on the data of the storage 13.

In addition, when a driver sets a low risk level to a vehicle which cuts in front of the subject vehicle while maintaining an inter-vehicle distance and stores the low risk level in the storage 13, the vehicle control device 14 may recognize the vehicle as a control target dangerous vehicle having a low risk level, based on the data of the storage 13.

Based on the risk level of the control target dangerous vehicle stored in the storage 13, the driver stores, in the storage 13, whether to generate the margin shaping, that is, whether to generate the virtual square, sets the size of the margin shaping, that is, the size of the virtual square to be generated, and stores it in the storage 13. In addition, the vehicle control device 14 may control such that the virtual square is generated in accordance of the driver intention of whether to generate the margin shaping for the control target dangerous vehicle stored in the storage 13. In this case, the driver intention may be understood as to whether to generate the virtual square based on the risk level stored in the storage 13 by the driver and how to set the size of the virtual square to be generated.

According to exemplary embodiments, in the case where the information about the generation of the largest size of the virtual square for a vehicle stored at a high risk level by the driver is stored in the storage 13, the vehicle control device 14 may control such that the virtual square having the largest size is generated for the control target dangerous vehicle having the level.

In addition, in the case where the generation of the virtual square having the smallest size for the vehicle stored at a low risk level by a driver is stored in the storage 13, the vehicle control device 14 may control, or issue a control signal, to generate the virtual square having the smallest size for the control target dangerous vehicle having a low risk level.

Meanwhile, in the case where the margin shaping is not generated for a vehicle stored in the storage 13 at a low risk level, the vehicle control device 14 may control such that the margin shaping is not generated. That is, the virtual square is not generated for the control target dangerous vehicle having a low risk level.

In more detail, the margin shaping may mean the generation of the virtual square more expanded than the size of the control target dangerous vehicle sensed by the front detection sensor 11 in forward, backward, left and right directions by a predetermined distance.

Thus, the vehicle control device 14 controls such that the front sensing sensor 11 senses a virtual square of the control target dangerous vehicle, so that the front sensing sensor 11 senses more sensitively the control target dangerous vehicle than actually sensed. Therefore, it may be easy to secure the safety distance from the control target dangerous vehicle targeted as a dangerous vehicle and prevent a collision with the control target dangerous vehicle. The details will be described with reference to FIG. 3.

Figure 3:
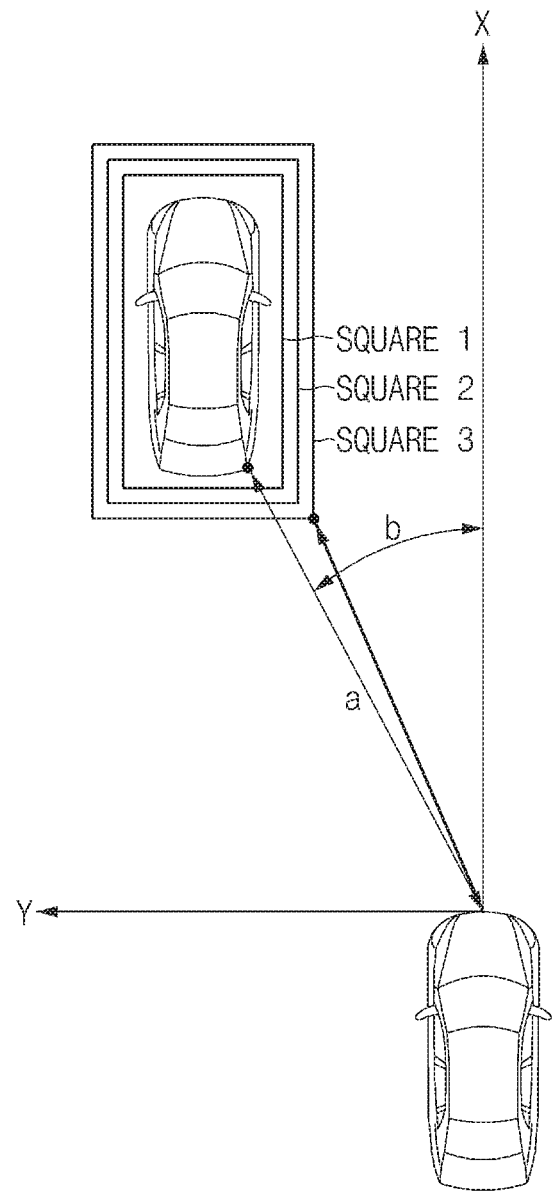
FIG. 3 is a view showing a virtual square generated through margin shaping according to exemplary embodiments of the present disclosure.

FIG. 3 is a view showing a virtual square generated through margin shaping according to exemplary embodiments of the present disclosure.

As shown in FIG. 3, the distance between the control target dangerous vehicle and the subject vehicle detected by the front detection sensor 11 is 'a' and the angle is 'b'. However, when reinforced through the margin shaping, the distance between the virtual square and the subject vehicle is smaller than 'a' and the angle is also smaller than 'b'.

It may be understood that the subject vehicle senses the control target dangerous vehicle more closely by the virtual square formed through the margin shaping than the control target dangerous vehicle actually sensed through the front detection sensor 11. That is, when the virtual square generated through the margin shaping is sensed, it may be sensed that the control target dangerous vehicle is located at a distance closer to the position where the control target dangerous vehicle is actually located. Therefore, while the vehicle is driven in the active safety driving mode, the driver may rapidly and safely avoid the control target dangerous vehicle, for example, the suddenly cut-in vehicle.

When the vehicle control device 14 generates the margin shaping, the vehicle control device 14 may generate the virtual square by setting a degree of expansion of the virtual square generated by actually sensing the control target dangerous vehicle based on the risk degree, with reference to the information about the control target dangerous vehicle stored in the storage 13 by the driver.

According to exemplary embodiments, the virtual square may include a first virtual square Square 1, a second virtual square Square 2, and a third virtual square Square 3. The first virtual square Square 1 may be a virtual square generated by expanding at the minimum the actual size of the control target dangerous vehicle to be spaced apart from the actual size of the control target dangerous vehicle by a predetermined distance, and the third virtual square Square 3 may be a virtual square generated by expanding at the maximum the actual size of the control target dangerous vehicle.

The first to third virtual squares may be set based on a range, a range rate, and an angle between the subject vehicle and the control target dangerous vehicle. The details will be described with reference to FIG. 4A and 4B.

FIGS. 4A and 4B are reference tables for margin shaping according to exemplary embodiments of the present disclosure.

As shown in FIG. 4A, in generating the virtual square, the range between the subject vehicle and the control target dangerous vehicle may be classified into "near", "normal" and "far". The range rate between the subject vehicle and the control target dangerous vehicle may be classified into "low", "normal" and 'high'. The angle between the subject vehicle and the control target dangerous vehicle may be classified into "small", "normal" and "large". In addition, the first to third virtual squares may be generated based on the result of combining values for each condition.

For example, when the range between the subject vehicle and the control target dangerous vehicle is small, the range rate is low, and the angle is small, the second virtual square may be generated by expanding the size of the control target dangerous vehicle by a predetermined interval.

In addition, as shown FIG. 4B, the range, the range rate, and the angle between the subject vehicle and the control target dangerous vehicle may be numerically expressed. The virtual square may be generated by using the sum of the numerical values based on each condition.

Figures 5A, 5B:
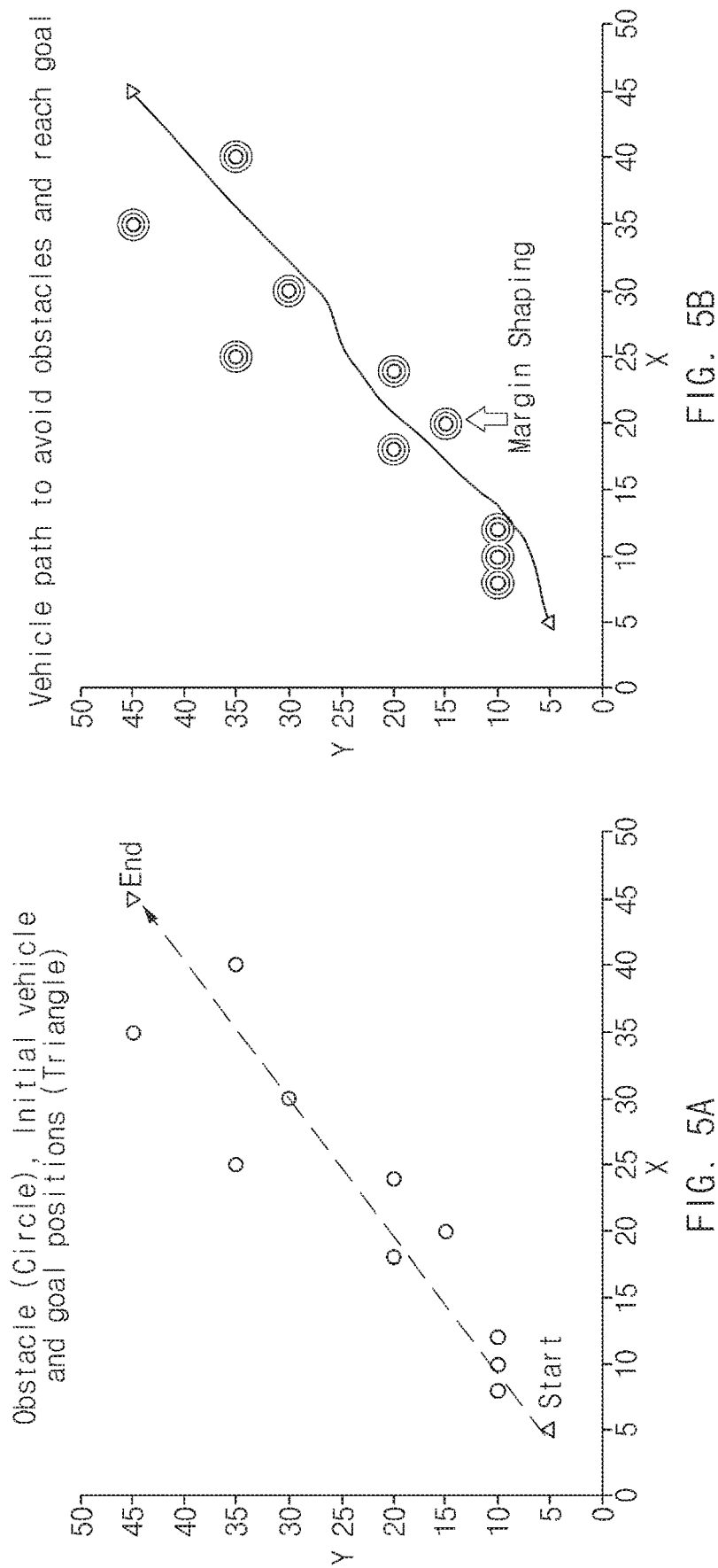
FIG. 5A and 5B are graphs illustrating a route through which a vehicle avoids a control target dangerous vehicle to reach a destination through margin shaping according to exemplary embodiments of the present disclosure.

FIG. 5A and 5B are graphs illustrating a route through which a vehicle avoids a control target dangerous vehicle to reach a destination through margin shaping according to exemplary embodiments of the present disclosure.

FIG. 5A shows an initial path that a vehicle may reach from a starting point to a final destination. In this case, it may be understood that the initial path is set where the subject vehicle overlaps the control target dangerous vehicle. If the subject vehicle travels along the initial path, the subject vehicle may collide with the control target dangerous vehicle.

Since the apparatus for controlling driving of a vehicle senses the virtual square generated through the margin shaping, the initial path may be changed as shown in FIG. 5B. Therefore, the control target dangerous vehicle may be detected as if the control target dangerous vehicle is closer to the subject vehicle, so that the subject vehicle may rapidly and safely avoid the control target dangerous vehicle.

In addition, when the vehicle control device 14 senses the virtual square generated through the margin shaping, the vehicle control device 14 may control the active safety driving device 10 such that the driving speed is reduced according to the range from the control target dangerous vehicle. A limitation may set to the deceleration range not to decrease by more than a predetermined range so that the driver is prevented from feeling uncomfortable when the driving speed is reduced. The deceleration range may be determined by calculating time-to-collision (TTC). The time-to-collision may be calculated based on the information obtained through the front detection sensor 11.

Figure 6:
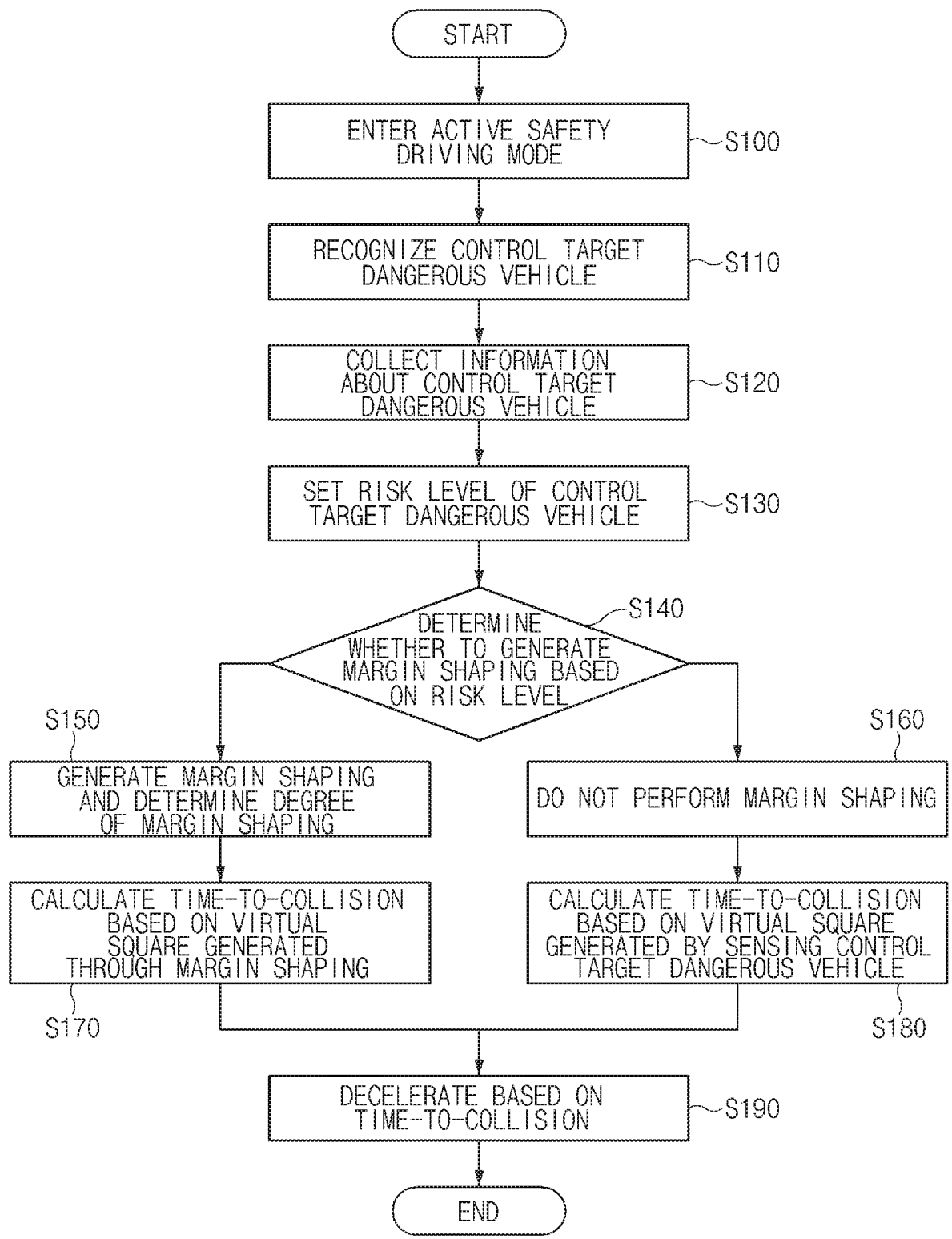
FIG. 6 is a flowchart illustrating a method of controlling a drive of a vehicle according to exemplary embodiments of the present disclosure.

FIG. 6 is a flowchart illustrating a method of controlling a drive of a vehicle according to exemplary embodiments of the present disclosure.

First, in operation S100, after the driver presses the accelerator pedal to accelerate the vehicle to a desired speed, the driver turns on the operation switch to enter the active safety running mode. The active safety driving mode includes at least one of smart cruise control (SCC), advanced emergency braking (AEB) and blind spot detection (BSD).

In the active safety driving mode, in operation S110, a front vehicle is recognized as a control target dangerous vehicle when the front vehicle is going to attempt to change to the lane on which the subject vehicle is traveling. In operation S120, the front detection sensor 11 detects the relative speed and the relative distance of the control target dangerous vehicle to collect information about the control target dangerous vehicle.

In operation S130, the vehicle control device 14 sets the risk level of the control target dangerous vehicle based on the information about the control target dangerous vehicle stored in the storage 13 by the driver.

According to exemplary embodiments, when the vehicle is set at a high risk level and stored in the storage 13 because the driver feels danger that the vehicle is, or may, suddenly cut in, the vehicle control device 14 may recognize the corresponding vehicle as the control target dangerous vehicle having a high risk level based on the data of the storage 13. When the driver sets a low risk level to a vehicle which cuts in while maintaining an inter-vehicle distance and stores the level in the storage 13, the vehicle control device 14 may recognize the corresponding vehicle as a control target dangerous vehicle having a low risk level based on the data of the storage 13.

The driver stores, in the storage 13, whether to generate the margin shaping, that is, to generate a virtual square based on the risk level of the control target dangerous vehicle stored in the storage 13. In operation S140, the vehicle control device 14 determines whether to generate the marginal shaping, that is, whether to generate a virtual square based on the data stored in the storage 13 by the driver intention.

In operation S150, when the driver determines to generate the margin shaping for the control target vehicle, the vehicle control device 14 generates the margin shaping for the control target dangerous vehicle.

According to exemplary embodiments, in the case where the margin shaping is generated for the vehicle stored at a high risk level by the driver and the vehicle is stored in the storage 13 to generate a virtual square of the largest amplitude, the vehicle control device 14 is controlled such that the virtual square having the largest amplitude is generated for the control target dangerous vehicle having a high risk level.

In addition, in the case where the margin shaping is generated for the vehicle stored at a low risk level by the driver and the vehicle is stored in the storage 13 to generate a virtual square of the smallest amplitude, the vehicle control device 14 generates the margin shaping for the control target dangerous vehicle having a low risk level and is controlled such that the virtual square having the smallest amplitude is generated.

Meanwhile, in operation S160, when the driver stores the vehicle at a low risk level and stores in the storage 13 that the margin shaping is not generated for the vehicle, the vehicle control device 14 does not generate the margin shaping for the control target dangerous vehicle having the low risk level, that is, does not generate any virtual squares.

In operation S170, when the margin shaping is generated for the control target dangerous vehicle, the vehicle control device 14 calculates time-to-collision between the subject vehicle and the virtual square based on the virtual square generated through the margin shaping.

In operation S180, when the vehicle control device 14 does not generate margin shaping for the control target dangerous vehicle, the vehicle control device 14 calculates time-to-collision between the subject vehicle and the control target dangerous vehicle based on the sensing of the control target dangerous vehicle.

In operation S190, the vehicle control device 14 decelerates the driving speed based on the calculated time-to-collision. In this case, the deceleration range may be limited when decelerating the driving speed such that the deceleration does not exceed a predetermined range, thereby preventing the driver from feeling uncomfortable.

Figure 7:
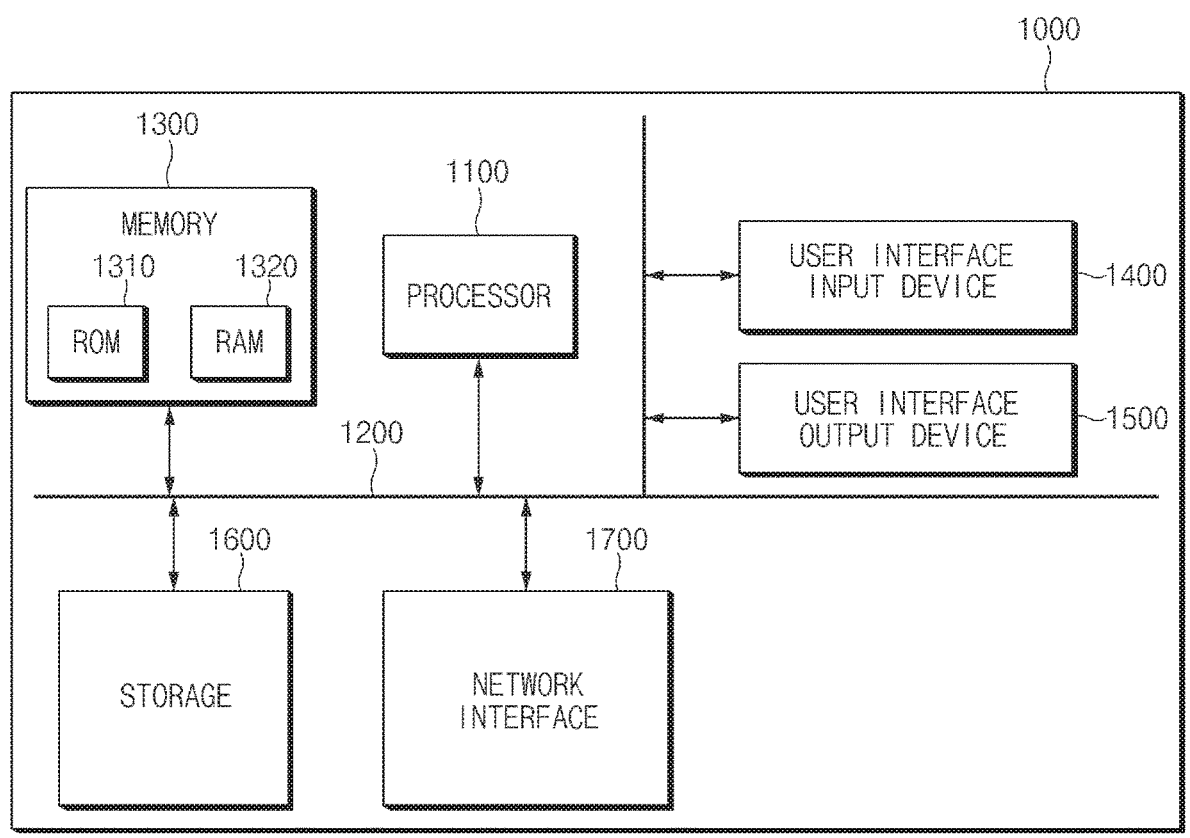
FIG. 7 is a block diagram illustrating a computer system for executing a method according to exemplary embodiments of the present disclosure.

FIG. 7 is a block diagram illustrating a computer system executing a method according to exemplary embodiments of the present disclosure.

Referring to FIG. 7, a computing system 1000 may include at least one processor 1100, a memory 1300, a user interface input device 1400, a user interface output device 1500, a storage 1600 and a network interface 1700, one or more of which are connected to each other through a bus 1200.

The processor 1100 may be a central processing unit (CPU) or a semiconductor device which generates processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software device executed by the processor 1100, or in a combination of the two. The software device may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

Although exemplary embodiments of the present disclosure have been described for illustrative purposes, those skilled in the art will appreciate that various modifications, additions and substitutions are possible, without departing from the scope and spirit of the present disclosure.

Therefore, the exemplary embodiments disclosed in the present disclosure are provided for the sake of descriptions, not for limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling driving of a vehicle, the apparatus comprising:
    an active safety driving device for changing a driving mode of the vehicle from a normal driving mode to an active safety driving mode;
    a front detection sensor for recognizing a front vehicle as a control target dangerous vehicle when the front vehicle attempts to change into a lane in which the vehicle travels; and
    a vehicle control device for determining whether to generate a margin shaping for the control target dangerous vehicle, and for controlling the active safety driving device based on the margin-shaped control target dangerous vehicle when the margin shaping is applied to the control target dangerous vehicle,
    wherein the vehicle control device determines whether to generate margin-shape for the control target dangerous vehicle based on a risk level, and determines whether the margin-shaping is applied to the control target dangerous vehicle based on a driver intention on a size of the margin shaping of control target dangerous vehicle.

2. The apparatus of claim 1, wherein the active safety driving mode includes at least one of smart cruise control (SCC), advanced emergency braking (AEB) and blind spot detection (BSD).

3. The apparatus of claim 1, wherein the front detection sensor includes a radar.

4. The apparatus of claim 1, wherein the margin shaping generates a virtual line through expansion from the control target dangerous vehicle sensed by the front detection sensor in forward, backward, left and right directions by a predetermined distance.

5. The apparatus of claim 1, wherein the margin shaping sets a degree of expanding the virtual line from the control target dangerous vehicle based on at least one of a range, a range rate, and an angle between the vehicle and the control target dangerous vehicle, and the margin shaping generates virtual lines having different amplitudes based on the expansion degree.

6. The apparatus of claim 1, wherein the vehicle control device sets the risk level of the control target dangerous vehicle based on a level set based on a degree of danger that the driver senses from the control target dangerous vehicle.

7. The apparatus of claim 1, wherein, when the margin shaping is applied to the control target dangerous vehicle, the vehicle control device controls the active safety driving device by limiting a deceleration range to prevent the vehicle from being decelerated over a predetermined range in consideration of time-to-collision (TTC) between the vehicle and the margin-shaped control target dangerous vehicle.

8. The apparatus of claim 1, wherein, when the margin shaping is not applied to the control target dangerous vehicle, the vehicle control device controls the active safety driving device by limiting a deceleration range to prevent the vehicle from being decelerated over a predetermined range in consideration of time-to-collision (TTC) between the vehicle and the control target dangerous vehicle.

9. The apparatus of claim 1, further comprising:
a storage for storing data including information about the control target dangerous vehicle detected by the front detection sensor, a level set based on a degree of detected danger for the control target dangerous vehicle, whether to margin-shape the control target dangerous vehicle based on the level, and the driver intention for determining a size of the margin shaping based on the level.

10. A method of controlling driving of a vehicle, the method comprising:
entering an active safety driving mode;
recognizing a front vehicle, which attempts to change into a lane in which the vehicle travels, as a control target dangerous vehicle;
collecting information about the control target dangerous vehicle;
setting a risk level of the control target dangerous vehicle;
determining whether to generate margin shaping for the control target dangerous vehicle based on the risk level;
determining a size of the margin shaping when the margin shaping is generated for the control target dangerous vehicle; and
decelerating, the vehicle based on the control target dangerous vehicle from which the margin shaping generated,
wherein the determining whether to generate margin shaping includes determining, by the vehicle control device, whether to generate the margin shaping for the control target dangerous vehicle based on the risk level of the control target dangerous vehicle set by a driver and a driver intention on determining of a size of the margin shaping set by the driver.

11. The method of claim 10, wherein the step of entering the active safety driving mode includes entering at least one of smart cruise control (SCC), advanced emergency braking (AEB) and blind spot detection (BSD).

12. The method of claim 10, wherein the step of collecting the information about the control target dangerous vehicle is generated by using a front detection sensor including a radar.

13. The method claim 10, wherein the step of setting the risk level includes:
setting, by a vehicle control device, the risk level of the control target dangerous vehicle based on the risk level of the control target dangerous vehicle set by the driver.

14. The method of claim 10, further comprising generating a virtual line through expansion from the control target dangerous vehicle in forward, backward, left and right directions by a predetermined distance based on the information about the control target dangerous vehicle when the margin shaping is generated for the control target dangerous vehicle.

15. The method of claim 10, wherein the step of determining the size of the margin shaping includes setting a degree of expanding the control target dangerous vehicle based on at least one of a range, a range rate, and an angle between the vehicle and the control target dangerous vehicle, and generating virtual lines having different amplitudes based on the expansion degree.

16. The method of claim 10, wherein the step of decelerating the vehicle based on the margin shaped control target dangerous vehicle includes decelerating the vehicle by limiting a deceleration range to prevent the vehicle from being decelerated over a predetermined range inconsideration of time-to-collision (TTC) between the vehicle and the margin-shaped control target dangerous vehicle.

17. The method of claim 10, further comprising when the margin shaping is not generated for the control target dangerous vehicle, decelerating the vehicle based on the control target dangerous vehicle actually sensed by the collecting of the information about the control target dangerous vehicle.

18. The method of claim 17, wherein the step of decelerating the vehicle based on the control target dangerous vehicle includes decelerating the vehicle by limiting a deceleration range to prevent the vehicle from being decelerated over a predetermined range in consideration of time-to-collision (TTC) between the vehicle and the control target dangerous vehicle.

* * * * *